United States Patent
Sasaki et al.

(10) Patent No.: US 8,692,413 B2
(45) Date of Patent: Apr. 8, 2014

(54) NONCONTACT ELECTRIC POWER RECEIVING DEVICE, NONCONTACT ELECTRIC POWER TRANSMITTING DEVICE, NONCONTACT ELECTRIC POWER FEEDING SYSTEM, AND VEHICLE

(75) Inventors: Masaru Sasaki, Toyota (JP); Shinji Ichikawa, Toyota (JP); Toru Nakamura, Toyota (JP); Yukihiro Yamamoto, Okazaki (JP); Taira Kikuchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 13/060,352

(22) PCT Filed: Mar. 18, 2009

(86) PCT No.: PCT/JP2009/055255
§ 371 (c)(1),
(2), (4) Date: Feb. 23, 2011

(87) PCT Pub. No.: WO2010/106648
PCT Pub. Date: Sep. 23, 2010

(65) Prior Publication Data
US 2011/0254376 A1    Oct. 20, 2011

(51) Int. Cl.
*H01F 27/42* (2006.01)
(52) U.S. Cl.
USPC .......................................................... 307/104
(58) Field of Classification Search
USPC .......................................................... 307/104
See application file for complete search history.

(56) References Cited

U.S. PATENT DOCUMENTS

| | | |
|---|---|---|
| 7,741,734 B2 | 6/2010 | Joannopoulos et al. |
| 2007/0216348 A1 | 9/2007 | Shionoiri et al. |
| 2007/0222542 A1 | 9/2007 | Joannopoulos et al. |
| 2008/0278264 A1 | 11/2008 | Karalis et al. |
| 2008/0297107 A1 | 12/2008 | Kato et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |

(Continued)

FOREIGN PATENT DOCUMENTS

| | | |
|---|---|---|
| AU | 2006269374 B2 | 1/2007 |
| AU | 2006269374 C1 | 1/2007 |

(Continued)

OTHER PUBLICATIONS

Office Action issued Mar. 16, 2012 in counterpart Chinese Patent Application No. 200980142772.6. (with English language translation).

(Continued)

*Primary Examiner* — Daniel Cavallari
(74) *Attorney, Agent, or Firm* — Oliff PLC

(57) ABSTRACT

In a noncontact electric power feeding system using a resonance method, electrical equipment installed within a coil case is configured to include an electric power receiving antenna and a rectifier in an integrated manner. The electrical equipment is driven by receiving electric power from an electromagnetic field generated by electromagnetic resonance, without power supply from the outside of the coil case.

15 Claims, 4 Drawing Sheets

(56) References Cited

U.S. PATENT DOCUMENTS

| | | |
|---|---|---|
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2010/0289331 A1 | 11/2010 | Shionoiri et al. |
| 2010/0328044 A1* | 12/2010 | Waffenschmidt et al. ... 340/10.4 |
| 2011/0254378 A1* | 10/2011 | Ichikawa et al. ............ 307/104 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101385218 A | 3/2009 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 61951/DELNP/2009 | 7/2010 |
| JP | A-2003-70170 | 3/2003 |
| JP | A-2008-295274 | 12/2008 |
| JP | A-2009-501510 | 1/2009 |
| KR | 2008-0031398 A | 4/2008 |
| KR | 2010-0015954 A | 2/2010 |
| WO | WO 2007/008646 A2 | 1/2007 |
| WO | WO 2008050260 A1 * | 5/2008 |
| WO | WO 2008/118178 A1 | 10/2008 |
| WO | WO 2009/023646 A2 | 2/2009 |

OTHER PUBLICATIONS

International Search Report dated Jun. 16, 2009 in International Patent Application No. PCT/JP2009/055255 (with translation).

* cited by examiner

STRENGTH OF
ELECTROMAGNETIC
FIELD

DISTANCE FROM ELECTRIC CURRENT SOURCE
(MAGNETIC CURRENT SOURCE)

NONCONTACT ELECTRIC POWER RECEIVING DEVICE, NONCONTACT ELECTRIC POWER TRANSMITTING DEVICE, NONCONTACT ELECTRIC POWER FEEDING SYSTEM, AND VEHICLE

TECHNICAL FIELD

The present invention relates to a noncontact electric power receiving device, a noncontact electric power transmitting device, a noncontact electric power feeding system, and a vehicle, and more particularly, to feeding of electric power to electrical equipment installed within a coil case.

BACKGROUND ART

As environmental friendly vehicles, electrically powered vehicles such as electric cars and hybrid cars are attracting great attention. These vehicles are equipped with a motor generating driving force for traveling, and a rechargeable power storage device storing electric power to be supplied to the motor. It is to be noted that hybrid cars include a vehicle further equipped with an internal combustion engine as a motive power source in addition to the motor, or a vehicle further equipped with a fuel cell as a direct current (DC) power source for driving the vehicle in addition to the power storage device.

Among the hybrid cars, a vehicle equipped with a power storage device that is chargeable from a power source external to the vehicle as in an electric car has been known. For example, a so-called "plug-in hybrid car", in which a power storage device is chargeable from a general household power source by connecting an electrical outlet provided in a house and a charging inlet provided in the vehicle via a charging cable, has been known.

Meanwhile, as a method of transmitting electric power, wireless electric power transmission not using a power source cord or an electric power transmission cable has been attracting attention in recent years. As predominant techniques for such wireless electric power transmission, there are three known techniques: electric power transmission using electromagnetic induction, electric power transmission using an electromagnetic wave, and electric power transmission using a resonance method.

Among them, the resonance method is a noncontact electric power transmission technique in which a pair of resonators (for example, a pair of self-resonant coils) are caused to resonate in an electromagnetic field (a near field) to transmit electric power via the electromagnetic field. The method allows transmission of large electric power of several kW over a relatively long distance (for example, several meters) (Patent Document 1).

Patent Document 1: WO2007/008646

DISCLOSURE OF THE INVENTION

Problems to be Solved by the Invention

In a case where noncontact electric power feeding using the resonance method as described above is performed, when the resonators (self-resonant coils) perform self-resonance and a current flows through the coils, the coils generate heat due to electric resistance of the coils themselves. Therefore, there may be a case where electrical equipment such as a cooling device or a monitoring device monitoring temperature is installed within coil cases that houses the resonators. Further, there may be a case where an indicator indicating that electric power is being fed or the like is also installed.

These electrical equipment require a power source for operating the equipment, and generally there may be a case where electric power is fed from the outside of the coil cases to the equipment via power lines.

In such a case, it is necessary to provide power lines for power supply from the outside, signal lines for outputting a signal indicating an abnormal condition and the like to the outside, and the like, within the coil cases. However, due to limited spaces in the coil cases, there are possibilities that positions for installing these electrical equipment may be limited, and that, by providing these lines close to the self-resonant coils, these lines may affect the electromagnetic field when the self-resonant coils perform electromagnetic resonance.

The present invention has been made to solve the problems as described above, and one object of the present invention is to feed electric power to electrical equipment installed within coil cases by utilizing an electromagnetic field generated by electromagnetic resonance, in transmission of electric power using the resonance method.

Means for Solving the Problems

A noncontact electric power receiving device in the present invention is a noncontact electric power receiving device receiving electric power via an electromagnetic field generated by electromagnetic resonance with an electric power transmitting device, including an electric power receiving unit, a case, and electrical equipment installed within the case. The electric power receiving unit receives electric power transmitted from the electric power transmitting device, by electromagnetic resonance. The case houses the electric power receiving unit therein. The electrical equipment installed within the case includes an electric power receiving antenna receiving electric power from the electromagnetic field, and an electric load using the electric power received by the electric power receiving antenna.

Preferably, the case has an electromagnetic shielding material for preventing leakage of the electromagnetic field to surroundings.

Preferably, the electromagnetic shielding material is provided with an opening in a surface of the case facing the electric power transmitting device.

Preferably, the electrical equipment further includes a rectifier receiving and rectifying the electric power received by the electric power receiving antenna.

Preferably, the electric load includes at least one of an indication device, a cooling device, a temperature detection device, and an electrically powered pump.

A noncontact electric power feeding system according to the present invention is a noncontact electric power feeding system feeding electric power from a power source from an electric power transmitting device to an electric power receiving device via an electromagnetic field generated by electromagnetic resonance, the electric power receiving device including the noncontact electric power receiving device described above.

A noncontact electric power transmitting device according to the present invention is a noncontact electric power transmitting device transmitting electric power from a power source to an electric power receiving device via an electromagnetic field generated by electromagnetic resonance with the electric power receiving device, including an electric power transmitting unit, a case, and electrical equipment installed within the case. The electric power transmitting unit transmits the electric power to the electric power receiving device by electromagnetic resonance. The case houses the electric power transmitting unit therein. The electrical equipment installed within the case includes an electric power receiving antenna receiving electric power from the electromagnetic field, and an electric load using the electric power received by the electric power receiving antenna.

Preferably, the case has an electromagnetic shielding material for preventing leakage of the electromagnetic field to surroundings.

Preferably, the electromagnetic shielding material is provided with an opening in a surface of the case facing the electric power receiving device.

Preferably, the electrical equipment further includes a rectifier receiving and rectifying the electric power received by the electric power receiving antenna.

Preferably, the electric load includes at least one of an indication device, a cooling device, a temperature detection device, and an electrically powered pump.

A noncontact electric power feeding system according to the present invention is a noncontact electric power feeding system feeding electric power from a power source from an electric power transmitting device to an electric power receiving device via an electromagnetic field generated by electromagnetic resonance, the electric power transmitting device including the noncontact electric power transmitting device described above.

A vehicle according to the present invention includes a noncontact electric power receiving device and an electrical drive apparatus. The noncontact electric power receiving device receives electric power from a power source external to the vehicle via an electromagnetic field generated by electromagnetic resonance with an electric power transmitting device external to the vehicle. The electrical drive apparatus receives the electric power received by the noncontact electric power receiving device to generate driving force for traveling the vehicle. The noncontact electric power receiving device includes an electric power receiving unit receiving electric power transmitted from the electric power transmitting device, by electromagnetic resonance, a case housing the electric power receiving unit therein, and electrical equipment installed within the case. The electrical equipment includes an electric power receiving antenna receiving electric power from the electromagnetic field, and an electric load using the electric power received by the electric power receiving antenna.

Preferably, the case has an electromagnetic shielding material for preventing leakage of the electromagnetic field to surroundings, and the electromagnetic shielding material is provided with an opening in a surface of the case facing the electric power transmitting device.

Preferably, the electrical equipment further includes a rectifier receiving and rectifying the electric power received by the electric power receiving antenna, and the electric load includes at least one of an indication device, a cooling device, a temperature detection device, and an electrically powered pump.

Effects of the Invention

According to the present invention, electric power can be fed to electrical equipment installed within coil cases by utilizing an electromagnetic field generated by electromagnetic resonance, in transmission of electric power using the resonance method.

DESCRIPTION OF THE REFERENCE SIGNS

Figure 1:
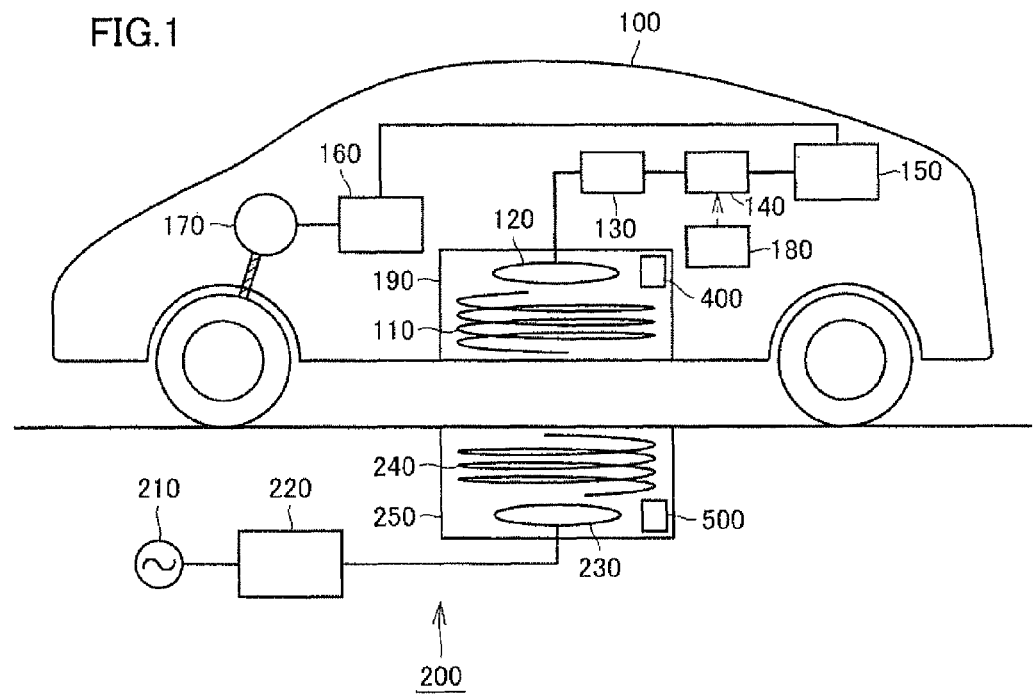
FIG. 1 is an overall configuration diagram of a noncontact electric power feeding system in accordance with a first embodiment of the present invention.

100: electrically powered vehicle, 110, 340: secondary self-resonant coil, 120, 350: secondary coil, 130: rectifier, 140: converter, 150, 431: power storage device, 160: PCU, 170: motor, 180: vehicular ECU, 190, 250: coil case, 195, 255: surface, 200: electric power feeding device, 210: AC power source, 220: high-frequency electric power driver, 230, 320: primary coil, 240, 330: primary self-resonant coil, 310: high-frequency power source, 360: load, 400, 400A, 400B, 400C, 400D, 500: electrical equipment, 410, 510: electric power receiving antenna, 420, 520: rectifier, 430, 430A, 430B, 430C, 530: electric load, 432; control device, 440: DC motor, 450: fan, 460: LED indicator, 470: temperature sensor, 480: optical conversion device, 490; temperature monitoring device.

BEST MODES FOR CARRYING OUT THE INVENTION

Hereinafter, an embodiment of the present invention will be described in detail with reference to the drawings. Identical or corresponding parts in the drawings will be designated by the same reference numerals, and the description thereof will not be repeated.

FIG. 1 is an overall configuration diagram of a noncontact electric power feeding system in accordance with an embodiment of the present invention. Referring to FIG. 1, the noncontact electric power feeding system includes an electrically powered vehicle 100 and an electric power feeding device 200. Electrically powered vehicle 100 includes a secondary self-resonant coil 110, a secondary coil 120, a coil case 190, a rectifier 130, a DC/DC converter 140, a power storage device 150, and electrical equipment 400 installed within coil case 190. Further, electrically powered vehicle 100 also includes a power control unit (hereinafter also referred to as a "PCU") 160, a motor 170, and a vehicular ECU (Electronic Control Unit) 180.

The configuration of electrically powered vehicle 100 is not limited to the configuration shown in FIG. 1 as long as it is a vehicle driven by a motor. For example, a hybrid vehicle equipped with a motor and an internal combustion engine, a fuel cell car equipped with a fuel cell, and the like are included.

Secondary self-resonant coil 110 is installed, for example, at a lower portion of a vehicle body. Secondary self-resonant coil 110 is an LC resonant coil with both ends being open (unconnected), and resonates with a primary self-resonant coil 240 (described later) of electric power feeding device 200 via an electromagnetic field to receive electric power from electric power feeding device 200. It is to be noted that, although the capacitance component of secondary self-resonant coil 110 is a stray capacitance of the coil, capacitors (not shown) may be additionally connected to the both ends of the coil to achieve a predetermined capacitance.

The number of turns of secondary self-resonant coil 110 is set as appropriate based on a distance to primary self-resonant coil 240 of electric power feeding device 200, a resonance frequency of primary self-resonant coil 240 and secondary self-resonant coil 110, and the like, to obtain a large Q value indicating strength of resonance between primary self-resonant coil 240 and secondary self-resonant coil 110 (for example, Q>100), a large κ indicating a degree of coupling thereof, and the like.

Secondary coil 120 is installed coaxially with secondary self-resonant coil 110, and can be magnetically coupled to secondary self-resonant coil 110 by electromagnetic induction. Secondary coil 120 extracts the electric power received by secondary self-resonant coil 110 using electromagnetic induction, and outputs it to rectifier 130.

Coil case 190 houses secondary coil 120 and secondary self-resonant coil 110 therein.

Rectifier 130 rectifies alternating current (AC) power extracted by secondary coil 120. DC/DC converter 140 converts the electric power rectified by rectifier 130 to have a voltage level for power storage device 150 and outputs it to power storage device 150, based on a control signal from vehicular ECU 180. In a case where the electric power is received from electric power feeding device 200 during traveling of the vehicle, DC/DC converter 140 may convert the electric power rectified by rectifier 130 to have a system voltage, and supply it directly to PCU 160. Further, DC/DC converter 140 is not necessarily required, and the AC power extracted by secondary coil 120 may be directly supplied to power storage device 150 after being rectified by rectifier 130.

Power storage device 150 is a rechargeable DC power source, and includes, for example, a secondary battery such as a lithium ion battery, a nickel-metal hydride battery, or the like. Power storage device 150 stores the electric power supplied from DC/DC converter 140, as well as regenerative electric power generated by motor 170. Power storage device 150 supplies the stored electric power to PCU 160. As power storage device 150, a capacitor having a large capacitance can also be employed, and any electric power buffer that can temporarily store the electric power supplied from electric power feeding device 200 and the regenerative electric power from motor 170, and supply the stored electric power to PCU 160 may be used.

PCU 160 drives motor 170 using the electric power output from power storage device 150 or the electric power directly supplied from DC/DC converter 140. Further, PCU 160 rectifies the regenerative electric power generated by motor 170 and outputs it to power storage device 150 to charge power storage device 150. Motor 170 is driven by PCU 160 to generate force to drive the vehicle and outputs it to driving wheels. Further, motor 170 generates electric power using kinetic energy received from the driving wheels, or an engine not shown in the case of a hybrid vehicle, and outputs the generated regenerative electric power to PCU 160.

Vehicular ECU 180 controls DC/DC converter 140 during feeding of the electric power from electric power feeding device 200 to electrically powered vehicle 100. For example, by controlling DC/DC converter 140, vehicular ECU 180 controls a voltage between rectifier 130 and DC/DC converter 140 to be a predetermined target voltage. Further, during traveling of the vehicle, vehicular ECU 180 controls PCU 160 based on a traveling state of the vehicle and a state of charge (also referred to as an "SOC") of power storage device 150.

Electrical equipment 400 installed within coil case 190 comprehensively indicates electrically driven units installed to monitor abnormalities, provide indication, and perform cooling within coil case 190. Electrical equipment 400 includes, for example, a cooling fan, an electrically powered pump for cooling, indication equipment such as an LED (Light Emitting Diode), a temperature detection device detecting an internal temperature, and the like.

On the other hand, electric power feeding device 200 includes an AC power source 210, a high-frequency electric power driver 220, a primary coil 230, primary self-resonant coil 240, a coil case 250, and electrical equipment 500 installed within coil case 250.

AC power source 210 is a power source external to the vehicle, and is, for example, a system power source. High-frequency electric power driver 220 converts electric power received from AC power source 210 into high-frequency electric power, and supplies the converted high-frequency electric power to primary coil 230. The high-frequency electric power generated by high-frequency electric power driver 220 has a frequency of for example, 1 MHz to several tens of MHz.

Primary coil 230 is installed coaxially with primary self-resonant coil 240, and can be magnetically coupled to primary self-resonant coil 240 by electromagnetic induction. Primary coil 230 feeds the high-frequency electric power supplied from high-frequency electric power driver 220 to primary self-resonant coil 240 by electromagnetic induction.

Primary self-resonant coil 240 is installed, for example, in the vicinity of a ground surface. Primary self-resonant coil 240 is also an LC resonant coil with both ends being open (unconnected), and resonates with secondary self-resonant coil 110 of electrically powered vehicle 100 via the electromagnetic field to transmit electric power to electrically powered vehicle 100. It is to be noted that, although the capacitance component of primary self-resonant coil 240 is also a stray capacitance of the coil, capacitors (not shown) may be additionally connected to the both ends of the coil, as in secondary self-resonant coil 110.

The number of turns of primary self-resonant coil 240 is also set as appropriate based on the distance to secondary self-resonant coil 110 of electrically powered vehicle 100, the resonance frequency of primary self-resonant coil 240 and secondary self-resonant coil 110, and the like, to obtain a large Q value (for example, Q>100), a large degree of coupling κ, and the like.

Coil case 250 houses primary coil 230 and primary self-resonant coil 240 therein.

Electrical equipment 500 installed within coil case 250 comprehensively indicates electrically driven units installed to monitor abnormalities, provide indication, and perform cooling within coil case 250. Electrical equipment 500 includes, for example, a cooling fan, an electrically powered pump for cooling, indication equipment such as an LED, a temperature detection device detecting an internal temperature, and the like, as an electric load.

Figure 2:
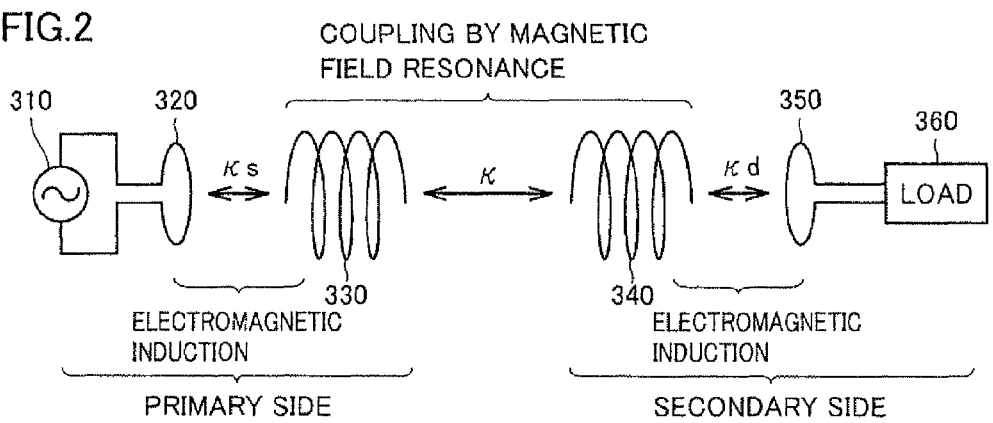
FIG. 2 is a view for illustrating a principle of electric power transmission using a resonance method.

FIG. 2 is a view for illustrating a principle of electric power transmission using a resonance method. Referring to FIG. 2, in the resonance method, as with resonance of two tuning forks, two LC resonant coils having the same natural frequency resonate in an electromagnetic field (a near field), and thereby electric power is transmitted from one coil to the other coil via the electromagnetic field.

Specifically, a primary coil 320 is connected to a high-frequency power source 310 to feed electric power having a high frequency of 1 MHz to several tens of MHz to a primary self-resonant coil 330 magnetically coupled to primary coil 320 by electromagnetic induction. Primary self-resonant coil 330 is an LC resonator having an inductance and a stray capacitance intrinsic to the coil (in a case where a capacitor is connected to the coil, the capacitance of the capacitor is included), and resonates via the electromagnetic field (near field) with a secondary self-resonant coil 340 having the same resonance frequency as that of primary self-resonant coil 330. Thereby, energy (electric power) is transferred from primary self-resonant coil 330 to secondary self-resonant coil 340 via the electromagnetic field. The energy (electric power) transferred to secondary self-resonant coil 340 is extracted by a secondary coil 350 magnetically coupled to secondary self-resonant coil 340 using electromagnetic induction, and is supplied to a load 360. It is to be noted that electric power transmission using the resonance method is implemented when the Q value, which indicates strength of resonance between primary self-resonant coil 330 and secondary self-resonant coil 340, is larger than, for example, 100.

Now, correspondence with FIG. 1 will be described. AC power source 210 and high-frequency electric power driver 220 in FIG. 1 correspond to high-frequency power source 310 in FIG. 2. Primary coil 230 and primary self-resonant coil 240 in FIG. 1 correspond to primary coil 320 and primary self-resonant coil 330 in FIG. 2, respectively. Secondary self-resonant coil 110 and secondary coil 120 in FIG. 1 correspond to secondary self-resonant coil 340 and secondary coil 350 in FIG. 2, respectively. Rectifier 130 and the components installed thereafter in FIG. 1 are comprehensively indicated as load 360.

Figure 3:
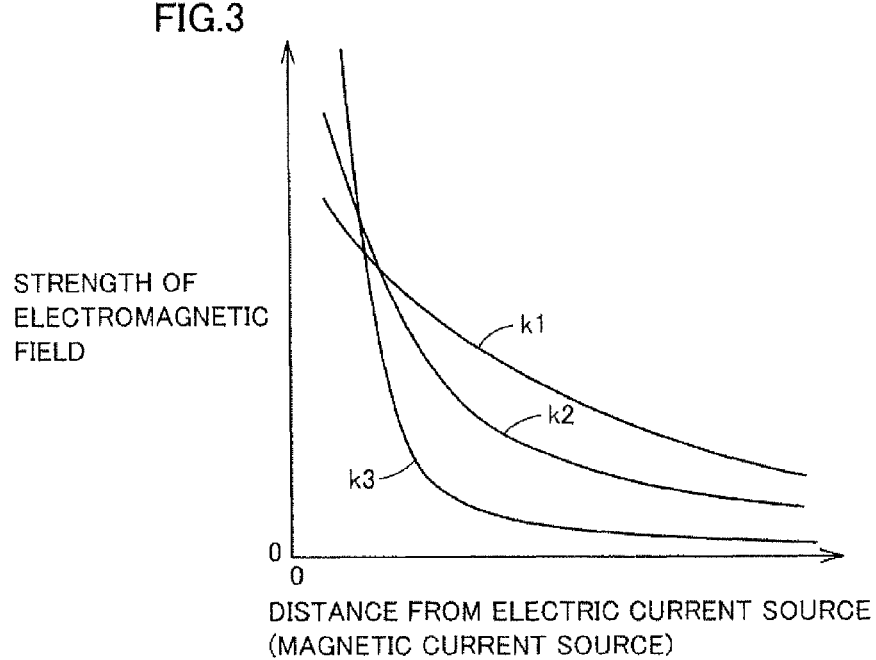
FIG. 3 is a view showing the relationship between a distance from an electric current source (a magnetic current source) and strength of an electromagnetic field.

FIG. 3 is a view showing the relationship between a distance from an electric current source (a magnetic current source) and strength of an electromagnetic field. Referring to FIG. 3, the electromagnetic field is composed of three components. A curved line k1 represents a component that is inversely proportional to a distance from a wave source, which is referred to as a "radiation electromagnetic field". A curved line k2 represents a component that is inversely proportional to the square of the distance from the wave source, which is referred to as an "induction electromagnetic field". A curved line k3 represents a component that is inversely proportional to the cube of the distance from the wave source, which is referred to as a "static electromagnetic field".

The "static electromagnetic field" is an area in which strength of an electromagnetic wave decreases rapidly with distance from the wave source. In the resonance method, energy (electric power) is transmitted utilizing a near field (an evanescent field) in which this "static electromagnetic field" is dominant. In other words, in the near field in which the "static electromagnetic field" is dominant, a pair of resonators (for example, a pair of LC resonant coils) having the same natural frequency are caused to resonate, and thereby energy (electric power) is transmitted from one resonator (primary self-resonant coil) to the other resonator (secondary self-resonant coil). Since the "static electromagnetic field" does not propagate energy over a long distance, the resonance method can transmit electric power with less energy loss, when compared with the electromagnetic wave that transmits energy (electric power) using the "radiation electromagnetic field" which propagates energy over a long distance.

Figure 4:
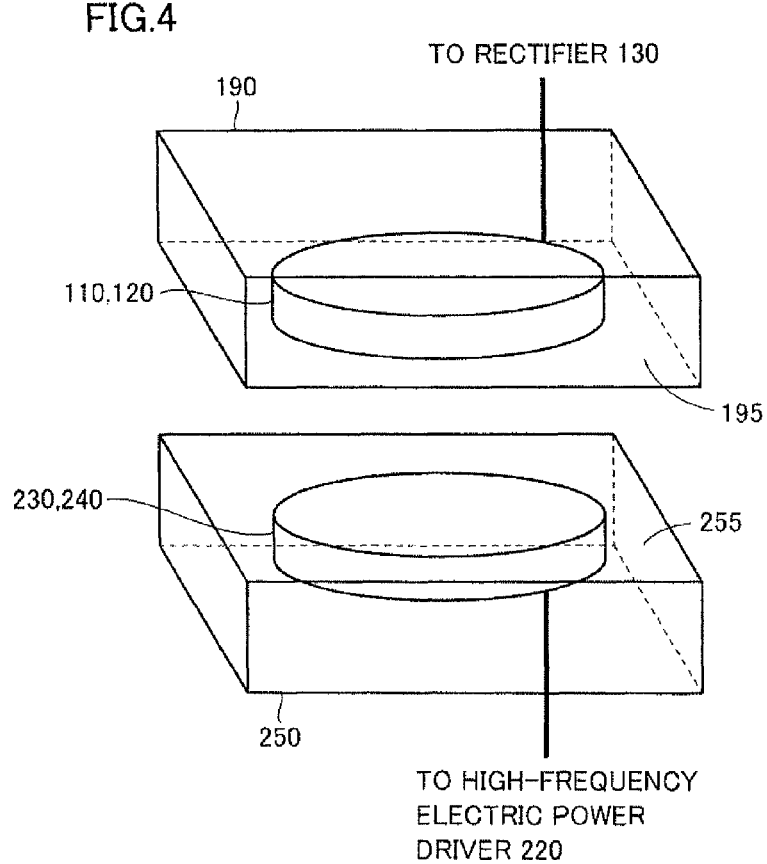
FIG. 4 is a view for illustrating coil cases shown in FIG. 1.

FIG. 4 is a view for illustrating structures of coil cases 190, 250 shown in FIG. 1 in detail. It is to be noted that, in FIG. 4, a unit composed of secondary self-resonant coil 110 and secondary coil 120 (hereinafter also referred to as an "electric power receiving unit") is illustrated in a cylindrical shape for brevity. The same applies to a unit composed of primary self-resonant coil 240 and primary coil 230 (hereinafter also referred to as an "electric power transmitting unit").

Referring to FIG. 4, coil case 190 is installed such that its surface 195 having the largest area can face the electric power transmitting unit. Coil case 190 is formed in the shape of a box with surface 195 being open. On the five surfaces other than surface 195, an electromagnetic shielding material (hereinafter also referred to as an "electromagnetic shield") (not shown) for reflecting a resonant electromagnetic field (near field) generated around the electric power receiving unit when receiving electric power from the electric power transmitting unit is attached to cover internal surfaces thereof. The electromagnetic shield is a low-impedance material, and for example thin copper foil or the like is used.

The electric power receiving unit composed of secondary self-resonant coil 110 and secondary coil 120 is installed within coil case 190 to receive electric power from the electric power transmitting unit via an opening (surface 195) of coil case 190. The reason for installing surface 195 having the largest area such that it can face the electric power transmitting unit is to secure efficiency of transmission from the electric power transmitting unit to the electric power receiving unit as much as possible.

Coil case 250 is also installed such that its surface 255 having the largest area can face the electric power receiving unit. Coil case 250 is formed in the shape of a box with surface 255 being open. On the five surfaces other than surface 255, an electromagnetic shield (not shown) for reflecting a resonant electromagnetic field (near field) generated around the electric power transmitting unit when transmitting electric power is attached to cover internal surfaces thereof.

The electric power transmitting unit composed of primary self-resonant coil 240 and primary coil 230 is installed within coil case 250 to transmit electric power to the electric power receiving unit via an opening (surface 255) of coil case 250. Again, the reason for installing surface 255 having the largest area such that it can face the electric power receiving unit is to secure efficiency of transmission from the electric power transmitting unit to the electric power receiving unit as much as possible.

The sizes of coil cases 190, 250, in particular the size of the one mounted on the vehicle, is determined in consideration of a mounting space and transmission efficiency. Namely, in view of the mounting space in the vehicle, it is preferable that coil case 190 is as small as possible. In contrast, in view of transmission efficiency, larger coil case 190 is preferable.

During feeding of electric power using the resonance method, self resonance of primary self-resonant coil 240 and secondary self-resonant coil 110 (hereinafter also collectively referred to as "self-resonant coils") results in generation of heat in the coils and the capacitors. Further, heat transfer from the coils and leakage of the electromagnetic field may cause generation of heat in a coil fixing material and the like. Therefore, there may be a case where monitoring equipment for monitoring temperatures within coil cases 190, 250, or cooling equipment for cooling a heat-generating portion is installed within coil cases 190, 250. Further, there may be a case where indication equipment for confirming whether or not a high-frequency electromagnetic field is generated during feeding of electric power is required.

Although these equipment require a power source for driving the equipment, in a case where power supply is provided from the outside of the coil cases, positions for installing the equipment may be limited due to wiring of power lines and signal lines and spaces where they can be installed within the coil cases. In particular, in coil case 190 of the electric power receiving device mounted on the vehicle, the space within the coil case is highly likely to be limited.

In addition, a cooling device is preferably installed to be as close to a heat-generating coil as possible. However, if a line is provided close to the self-resonant coils, it may affect electromagnetic resonance, and also may cause a reduction in transmission efficiency.

Further, as described above, there may be a case where the electromagnetic shield is attached inside the coil cases to prevent leakage of the electromagnetic field to the surroundings. If power supply is provided from the outside of the coil cases, line holes for drawing the power lines into the coil cases are required. In such a case, the electromagnetic field may leak from the line holes.

Furthermore, due to contact between the electromagnetic shield and the power lines, a high-frequency current on the surface of the electromagnetic shield may impede current flow to the electrical equipment within the coil cases, or may reduce shielding performance of the electromagnetic shield.

Therefore, in the first embodiment, electrical equipment 400, 500 installed within the coil cases are configured to include a unit in which an electric power receiving antenna for receiving electric power from an electromagnetic field generated by electromagnetic resonance and a rectifier for rectifying received AC power to DC current are integrated. This eliminates the need for providing power supply from the outside of the coil cases, and prevents a reduction in shielding property of the coil cases and transmission efficiency.

Figure 5:
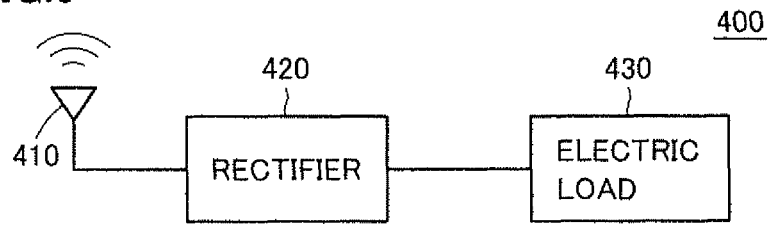
FIG. 5 is a view showing a basic configuration of electrical equipment installed within a coil case of an electric power receiving device.

FIG. 5 is a view showing a basic configuration of electrical equipment 400 installed within coil case 190 on an electric power receiving side.

Referring to FIG. 5, electrical equipment 400 includes an electric power receiving antenna 410, a rectifier 420, and an electric load 430.

Electric power receiving antenna 410 receives an electromagnetic field generated from the electric power transmitting unit to receive electric power. Then, electric power receiving antenna 410 outputs received AC power to rectifier 420. The configuration of electric power receiving antenna 410 is not limited as long as it is an antenna capable of receiving electric power from an electromagnetic field, and a known antenna is applicable. Examples of electric power receiving antenna 410 include a parabolic antenna, a loop antenna, a patch antenna, a horn antenna, a resonant antenna, and the like.

Rectifier 420 receives and rectifies the AC power from electric power receiving antenna 410. Then, rectifier 420 supplies rectified DC power to electric load 430.

Electric load 430 includes a cooling device, an indication device, a monitoring device, and the like, and the details thereof will be described later.

It is to be noted that the electric power received by electric power receiving antenna 410 increases or decreases according to the strength of the electromagnetic field, that is, the electric power transmitted from the electric power transmitting unit. Accordingly, the DC power rectified by rectifier 420 may also have fluctuations in voltage and/or current. Depending on the types of electric load 430, the fluctuations in electric power may be utilized to increase or decrease the revolution speed of the motor, as in a cooling device described later. In contrast, if it is preferable to use electric load 430 at a constant voltage, as in a control device, a converter for a sensor, and the like, a constant voltage adjustment circuit may be provided to rectifier 420 as necessary.

Further, to prevent the main body of electrical equipment 400 from being affected by the electromagnetic field or generating heat by the electromagnetic field, electrical equipment 400 (exclusive of electric power receiving antenna 410) may be covered with the electromagnetic shield as necessary.

Hereinafter, concrete examples of electric load 430 will be described with reference to FIGS. 6 to 8.

Figure 6:
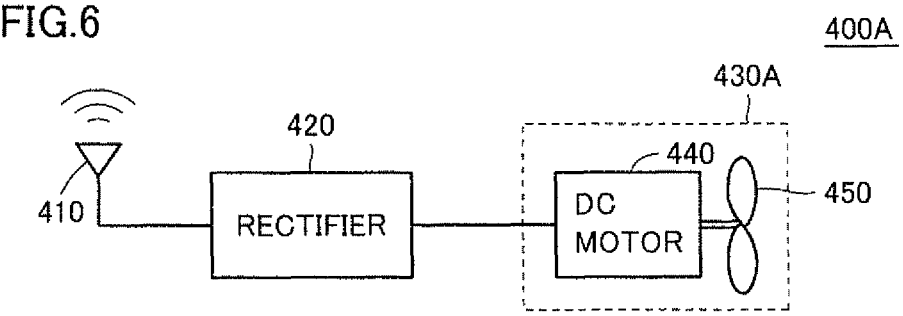
FIG. 6 is a view showing a first concrete example of the electrical equipment installed within the coil case of the electric power receiving device.

FIG. 6 shows an example where a cooling fan is employed as an electric load 430A. Referring to FIG. 6, electrical equipment 400A includes electric power receiving antenna 410, rectifier 420, and electric load 430A. Electric load 430A includes a DC motor 440 and a fan 450.

DC motor 440 receives the DC power from rectifier 420, and is driven to rotate fan 450. Fan 450 is used to circulate air within coil case 190 and suppress stagnation of heat, or ventilate the air within coil case 190, and thus can cool the inside of coil case 190.

If large electric power is fed from the electric power transmitting unit, the amount of heat generated by secondary self-resonant coil 110 and the capacitors (not shown) is increased accordingly. Therefore, to change cooling ability according to the amount of generated heat in a case where a cooling device to which power supply is provided from the outside of coil case 190 is used, it is necessary to control the cooling device such that a driving command for the cooling device is changed according to the temperature inside coil case 190 and transmitted electric power.

With the configuration as shown in FIG. 6, however, if electric power fed from the electric power transmitting unit is increased, the strength of the electromagnetic field generated is also increased, and thus the electric power received by electric power receiving antenna 410 is increased accordingly. In other words, the revolution speed of DC motor 440 is increased. Therefore, cooling ability according to fed electric power can be output without a need for special control as described above.

As a variation of such a cooling device, a case where an electrically powered pump (not shown) is used instead of fan 450 is conceivable. Examples thereof include a case where secondary self-resonant coil 110 is a hollow coil member, and cooling is performed by causing a refrigerant (for example, pure water or the like) to flow therethrough. Since the revolution speed of the electrically powered pump can be changed according to fed electric power also in this case, cooling ability according to fed electric power can be obtained by increasing or decreasing the amount of flow of the refrigerant.

Figure 7:
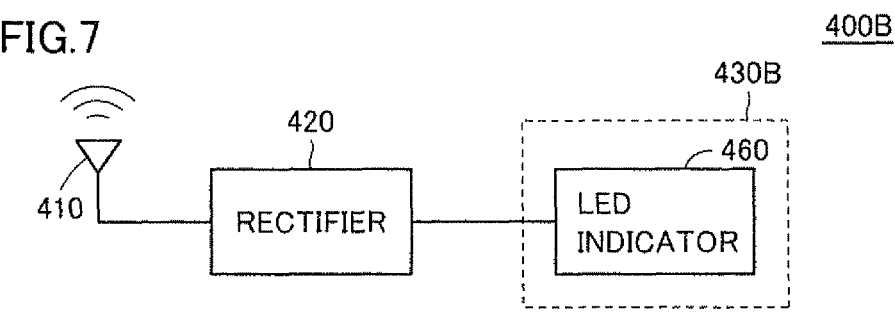
FIG. 7 is a view showing a second concrete example of the electrical equipment installed within the coil case of the electric power receiving device.

Next, FIG. 7 shows an example where an indication device is employed as an electric load 430B. Referring to FIG. 7, electrical equipment 400B includes electric power receiving antenna 410, rectifier 420, and electric load 430B. Electric load 430B includes an LED indicator 460 indicating whether or not a high-frequency electromagnetic field is generated.

In this case, when electric power is fed from the electric power transmitting unit is performed (i.e., when a high-frequency electromagnetic field is generated), power supply is provided to LED indicator 460 to illuminate the LED. Therefore, also in this case, whether or not a high-frequency electromagnetic field is generated can be indicated appropriately without performing special control for indication.

Figure 8:
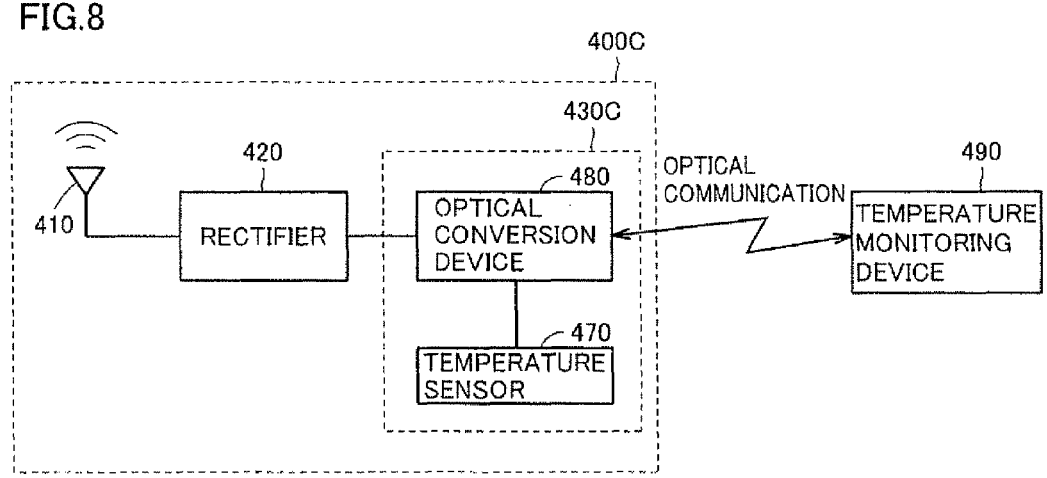
FIG. 8 is a view showing a third concrete example of the electrical equipment installed within the coil case of the electric power receiving device.

FIG. 8 shows an example where a temperature detection device within coil case 190 is employed as an electric load 430C. Referring to FIG. 8, electrical equipment 400C includes electric power receiving antenna 410, rectifier 420, and electric load 430C. Electric load 430C includes a temperature sensor 470 and an optical conversion device 480, as the temperature detection device.

As temperature sensor 470, for example, a known thermistor is applicable. A thermistor is a temperature sensor having an electric resistance that varies according to a change in temperature. Further, a temperature sensor other than a thermistor, such as a thermocouple or a resistance temperature detector, is also applicable. Temperature sensor 470 is placed on an object of measurement within coil case 190, at an appropriate position thereof.

Optical conversion device 480 senses the electric resistance of temperature sensor 470 and the like to detect a temperature of the object of measurement. Further, optical conversion device 480 converts information about the detected temperature into an optical signal, and outputs it to a temperature monitoring device 490 external to coil case 190 through optical communication.

Temperature monitoring device 490 performs controls such as indicating the temperature and outputting a warning, based on the information about the temperature received through optical communication.

Although FIG. 8 illustrates a case where detection of the temperature inside coil case 190 is performed, sensors corresponding to other items to be monitored, for example the strength of the electromagnetic field, a motor current of the cooling device described above, and the like, may be installed for monitoring.

Figure 9:
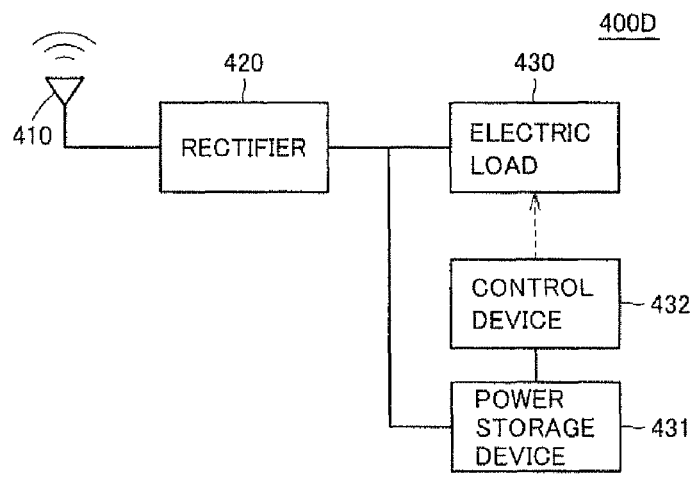
FIG. 9 is a view showing a variation of the electrical equipment installed within the coil case of the electric power receiving device.

FIG. 9 shows a configuration as a variation of those described above in which, as electrical equipment 400D, a power storage device 431 is provided in parallel with electric load 430.

Referring to FIG. 9, electrical equipment 400D includes electric power receiving antenna 410, rectifier 420, electric load 430, power storage device 431, and a control device 432.

Power storage device 431 is a rechargeable DC power source, and includes, for example, a secondary battery such as a lithium ion battery, a nickel-metal hydride battery, or the like. Alternatively, a capacitor or the like can be employed. Power storage device 431 can be charged when it is fed with electric power from the electric power transmitting unit.

With such a configuration, electric load 430 can be driven even when electric power is not fed from the electric power transmitting unit. Further, electric load 430 can also be controlled by connecting control device 432 to power storage device 431, for example when the cooling device is driven for a certain time after feeding of electric power is finished, or when the inside of coil case 190 is monitored regardless of whether or not feeding of electric power is performed.

Although electrical equipment 400 installed within coil case 190 on the electric power receiving side has been described in the description of FIGS. 5 to 9, the description is also applicable to electrical equipment 500 installed within coil case 250 on the electric power transmitting side.

Figure 10:
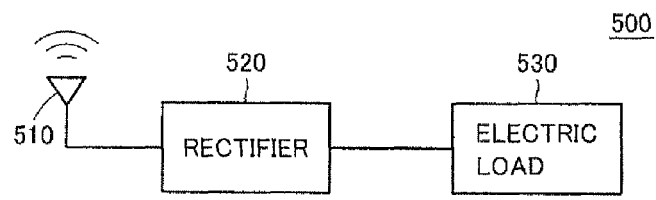
FIG. 10 is a view showing a basic configuration of electrical equipment installed within a coil case of an electric power transmitting device.

FIG. 10 shows a basic configuration of electrical equipment 500 installed within coil case 250. Referring to FIG. 10, electrical equipment 500 includes an electric power receiving antenna 510, a rectifier 520, and an electric load 530, as in the configuration of FIG. 5 described for the electric power receiving side. Since electric power receiving antenna 510, rectifier 520, and electric load 530 correspond to electric power receiving antenna 410, rectifier 420, electric load 430 in FIG. 5, respectively, the detailed description will not be repeated.

As has been described above, by configuring electrical equipment 400, 500 installed within coil cases 190, 250 to include electric power receiving antennas 410, 510 and rectifiers 420, 520 in an integrated manner, respectively, in the noncontact electric power feeding system using the resonance method, electrical equipment 400, 500 can be driven by receiving electric power from an electromagnetic field generated by electromagnetic resonance, without power supply from the outside of coil cases 190, 250.

As a result, wiring of power lines within coil cases 190, 250 is not required, and positions for installing electrical equipment 400, 500 are not limited by a restriction on installation of the power lines, which increases a degree of freedom of the installation positions. Further, since the power lines within coil cases 190, 250 are not required, an effect on electromagnetic resonance caused by the lines being provided close to the self-resonant coils can also be prevented.

Further, since line holes for drawing the power lines into coil cases 190, 250 are not required, a reduction in shielding performance of the electromagnetic shield or an impediment to current flow to electrical equipment 400, 500 due to contact between the electromagnetic shield and the power lines can also be prevented.

Furthermore, in a case where a cooling device or the like is connected as electrical equipment 400, 500, electric power received by electric power receiving antennas 410, 510 is increased or decreased according to electric power fed from the electric power transmitting unit. Therefore, cooling ability according to the electric power fed from the electric power transmitting unit can be obtained without adding a complicated control device.

It is to be noted that PCU 160 and motor 170 in the present embodiment are examples of the "electrical drive apparatus" in the present invention. Further, coil cases 190, 250 in the present embodiment are examples of the "case" in the present invention.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

The invention claimed is:

1. A noncontact electric power receiving device receiving electric power via an electromagnetic field generated by electromagnetic resonance with an electric power transmitting device, comprising:
   an electric power receiving unit receiving electric power transmitted from said electric power transmitting device by electromagnetic resonance;
   a case housing said electric power receiving unit therein; and
   electrical equipment installed within said case, said electrical equipment being different from said electric power receiving unit,
   said electrical equipment including:
      an electric power receiving antenna receiving the electric power from said electromagnetic field produced during said transmission of said electric power from said electric power transmitting device to said electric power receiving unit, and
      an electric load using the electric power received by said electric power receiving antenna.

2. The noncontact electric power receiving device according to claim 1, wherein said case has an electromagnetic shielding material configured to prevent leakage of said electromagnetic field from said case.

3. The noncontact electric power receiving device according to claim 2, wherein said electromagnetic shielding material is provided with an opening in a surface of said case facing said electric power transmitting device.

4. The noncontact electric power receiving device according to claim 2, wherein said electrical equipment further includes a rectifier receiving and rectifying the electric power received by said electric power receiving antenna.

5. The noncontact electric power receiving device according to claim 4, wherein said electric load includes at least one of an indication device, a cooling device, a temperature detection device, and an electrically powered pump.

6. A noncontact electric power feeding system feeding electric power from a power source of an electric power transmitting device to an electric power receiving device via an electromagnetic field generated by electromagnetic resonance, said electric power receiving device including the noncontact electric power receiving device according to claim 1.

7. A noncontact electric power transmitting device transmitting electric power from a power source to an electric power receiving device via an electromagnetic field generated by electromagnetic resonance with said electric power receiving device, comprising:
   an electric power transmitting unit transmitting said electric power to said electric power receiving device by electromagnetic resonance;
   a case housing said electric power transmitting unit therein; and
   electrical equipment installed within said case, said electrical equipment being different from said electric power transmitting unit,
   said electrical equipment including:
      an electric power receiving antenna receiving the electric power from said electromagnetic field produced during transmission of said electric power from said electric power transmitting unit to said electric power receiving device, and
      an electric load using the electric power received by said electric power receiving antenna.

8. The noncontact electric power transmitting device according to claim 7, wherein said case has an electromagnetic shielding material configured to prevent leakage of said electromagnetic field from said case.

9. The noncontact electric power transmitting device according to claim 8, wherein said electromagnetic shielding material is provided with an opening in a surface of said case facing said electric power receiving device.

10. The noncontact electric power transmitting device according to claim 8, wherein said electrical equipment further includes a rectifier receiving and rectifying the electric power received by said electric power receiving antenna.

11. The noncontact electric power transmitting device according to claim 10, wherein said electric load includes at least one of an indication device, a cooling device, a temperature detection device, and an electrically powered pump.

12. A noncontact electric power feeding system feeding electric power from a power source of an electric power transmitting device to an electric power receiving device via an electromagnetic field generated by electromagnetic resonance, said electric power transmitting device including the noncontact electric power transmitting device according to claim 7.

13. A vehicle, comprising:
   a noncontact electric power receiving device receiving electric power from a power source external to said vehicle via an electromagnetic field generated by electromagnetic resonance with an electric power transmitting device external to said vehicle, and
   an electrical drive apparatus receiving the electric power received by said noncontact electric power receiving device to generate a driving force for traveling said vehicle,
   said noncontact electric power receiving device including:
      an electric power receiving unit receiving the electric power transmitted from said electric power transmitting device by electromagnetic resonance,
      a case housing said electric power receiving unit therein, and
      electrical equipment installed within said case, said electrical equipment being different from said electric power receiving unit,
      said electrical equipment including:
         an electric power receiving antenna receiving the electric power from said electromagnetic field produced during transmission of said electric power from said electric power transmitting device to said electric power receiving unit, and
         an electric load using the electric power received by said electric power receiving antenna.

14. The vehicle according to claim 13, wherein
said case has an electromagnetic shielding material configured to prevent leakage of said electromagnetic field from said case, and
said electromagnetic shielding material is provided with an opening in a surface of said case facing said electric power transmitting device.

15. The vehicle according to claim 14, wherein
said electrical equipment further includes a rectifier receiving and rectifying the electric power received by said electric power receiving antenna, and
said electric load includes at least one of an indication device, a cooling device, a temperature detection device, and an electrically powered pump.

* * * * *